(12) United States Patent
Nakaya

(10) Patent No.: US 6,370,088 B1
(45) Date of Patent: Apr. 9, 2002

(54) PHOTOMAGNETIC RECORDING/ REPRODUCTION APPARATUS

(75) Inventor: Yoshihisa Nakaya, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/566,132

(22) Filed: May 5, 2000

(30) Foreign Application Priority Data

May 10, 1999 (JP) .......................................... 11-128481

(51) Int. Cl.[7] .............................................. G11B 11/00
(52) U.S. Cl. .................................. 369/13.21; 369/13.34
(58) Field of Search ........................... 369/13.21, 13.12, 369/13.11, 13.2, 13.34, 13.17, 13.32, 75.2, 77.2

(56) References Cited

U.S. PATENT DOCUMENTS

| | | | | |
|---|---|---|---|---|
| 4,993,009 A | * | 2/1991 | Shiho ............................ | 369/13 |
| 5,182,742 A | * | 1/1993 | Ohmori et al. ................ | 369/13 |
| 5,587,973 A | * | 12/1996 | Kanazawa et al. ............ | 369/13 |
| 5,604,719 A | * | 2/1997 | Kakimoto et al. ............ | 369/13 |
| 5,687,142 A | * | 11/1997 | Tamada ........................ | 369/13 |
| 5,970,037 A | * | 10/1999 | Kanazawa et al. ............ | 369/13 |

FOREIGN PATENT DOCUMENTS

| | | |
|---|---|---|
| JP | 9-44975 | 2/1997 |
| JP | 9-213031 | 8/1997 |
| JP | 10-275394 | 10/1998 |

* cited by examiner

Primary Examiner—Tan Dinh
(74) Attorney, Agent, or Firm—Morgan, Lewis & Bockius LLP

(57) ABSTRACT

A position detecting switch SW1 detects insertion of a disk 1 into a movable holder 3. A reproducing position detecting switch SW2 detects a reproducing position RP of the disk 1. A recording position detecting switch SW3 detects a recording position RC of the disk 1. A mechanism controller 28 controls a series of operations of a driving mechanism on the basis of detection signals delivered from the detecting switches SW1 to SW3. The mechanism controller 28 moves the movable holder 3 from the recording position RC to the reproducing position RP by further moving the movable holder 3 by a predetermined distance in a direction of ejection beyond the reproducing position RP and then moving the movable holder 3 back to the reproducing position RP. The movement is detected by the reproducing position detecting switch SW2 to thereby detect the reproducing position RP of the disk 1.

5 Claims, 7 Drawing Sheets

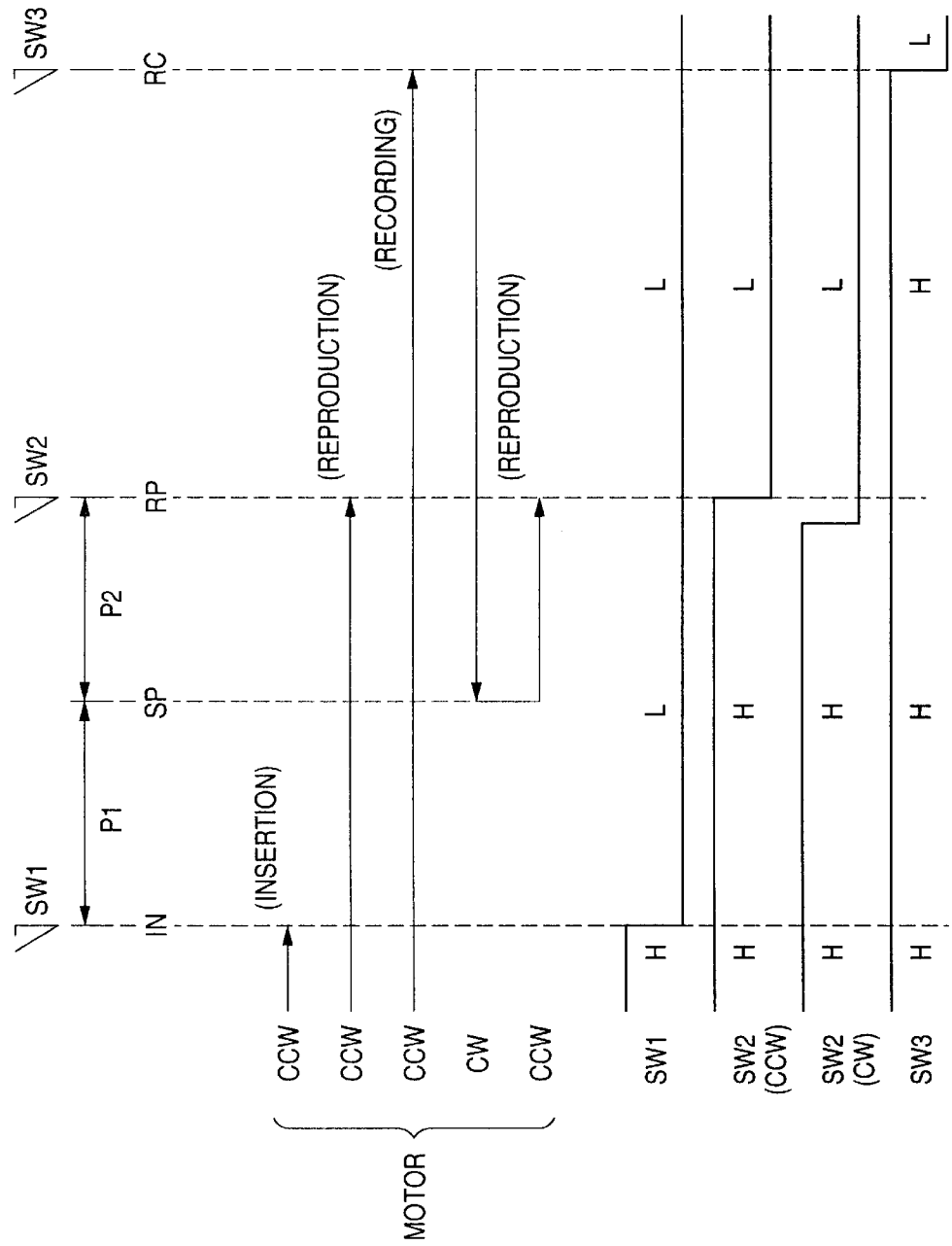

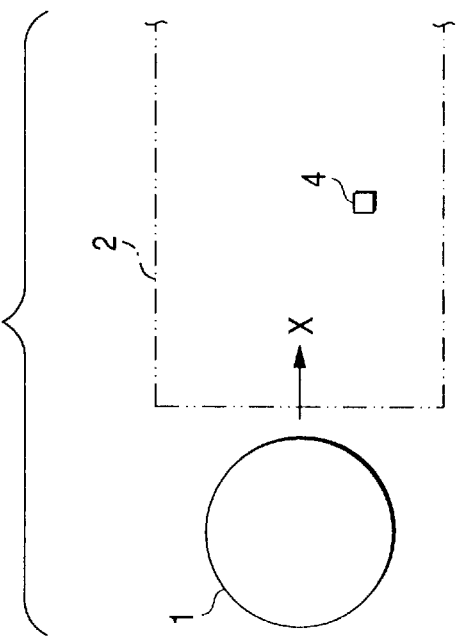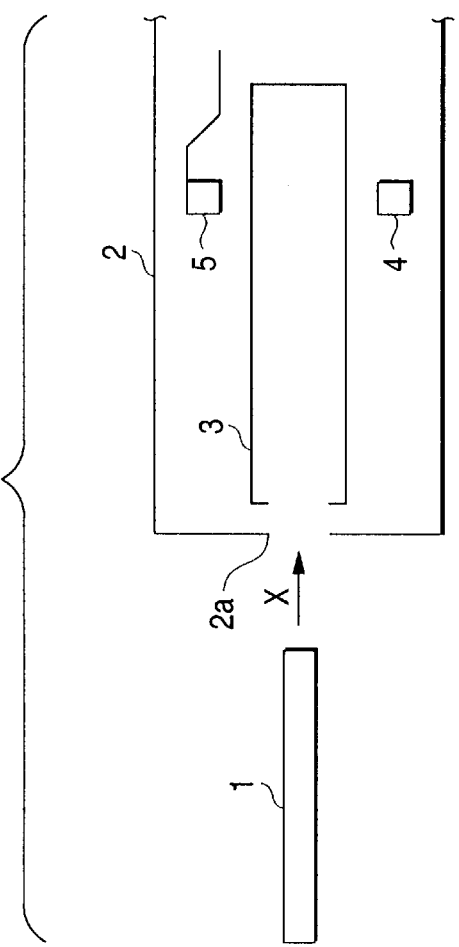

PHOTOMAGNETIC RECORDING/REPRODUCTION APPARATUS

BACKGROUND OF THE INVENTION

The present invention relates to a photomagnetic recording/reproduction apparatus (so-called mini-disk (MD) recorder) for performing photomagnetic recording on a disk-like recording medium (photomagnetic disk) and reproduction therefrom by converting an analog signal such as an audio signal, or the like, into a digital signal.

A photomagnetic recording/reproduction apparatus (MD recorder) for performing recording on a photomagnetic disk by converting an analog audio signal into a digital signal has been recently rapidly popularized as an audio signal recording/reproduction apparatus in place of an analog cassette recorder. Various techniques have been proposed to attain improvement of handling property of the photomagnetic recording/reproduction apparatus. For example, Japanese Patent Publication No. 9-213031A has disclosed a photomagnetic recording/reproduction apparatus in which searching for a target position can be performed at a high speed. For example, Japanese Patent Publication No. 9-44975A has disclosed a photomagnetic recording/reproduction apparatus in which an editing process such as track dividing, track erasing, etc. can be performed easily.

FIGS. 4 to 7 schematically show a series of operations in such a photomagnetic recording/reproduction apparatus in the case where a photomagnetic disk (hereinafter merely referred to as disk) is loaded into an apparatus body. Incidentally, FIGS. 4A, 5A, 6A and 7A are schematic side sectional views and FIGS. 4B, 5B, 6B and 7B are schematic top views.

That is, if a user inserts a disk 1, through an insertion hole 2a of an apparatus body 2, into a movable holder 3 provided in the inside of the apparatus body 2 (in a direction of an arrow X in FIG. 4), a motor not shown but provided in the inside of the apparatus body 2 is driven so that the disk 1 is led into the movable holder 3 automatically at a point of time when the disk 1 has been inserted to a certain position A (FIG. 5). At the same time, the movable holder 3 itself is loaded in the X direction to a reproducing position (position shown in FIG. 6) opposite to a photo pick-up 4 disposed in the inside of the apparatus body 2. That is, this is a state in which reproduction is enabled to be started. In this state, the photo pick-up 4 is located on a line L which is in a direction (disk scanning direction) Y perpendicular to the X direction (hereinafter also referred to as loading direction X) and which passes through a center point O of the disk 1.

When the disk 1 is rotated in this state and the photo pick-up 4 is moved in the disk scanning direction Y on the line L, an audio signal is reproduced from the disk 1.

On the other hand, in a recording mode, a magnetic head 5 is moved down to a recording position (see FIG. 7) so as to come into contact with the disk 1, so that the reproducing state shown in FIG. 6 is changed to a recording-enabled state. That is, this is a state in which recording is enabled to be started. In this state, the photo pick-up 4 and the magnetic head 5 vertically opposite to each other are located on the line L which is in the disk scanning direction Y and which passes through the center point O of the disk 1.

When the disk 1 is rotated in this state and the photo pick-up 4 and the magnetic head 5 are integrally moved in the disk scanning direction Y on the line L, an audio signal is recorded on the disk 1.

In order to control various operations such as leading of the disk 1 into the movable holder 3, loading of the movable holder 3, positioning of the disk 1 and the photo pick-up 4 by the loading in the reproducing position, descending of the magnetic head 5, positioning of the descended magnetic head 5 and the disk 1 in the recording position, and positioning of the disk 1 and the photo pick-up 4 in the reproducing position by ascending the magnetic head 5 which has been in the descended position, it is necessary to provide detecting switches for detecting the aforementioned positions and states in the apparatus body 2.

In this occasion, in order to detect the operations one by one accurately, it is ideal to provide an exclusive detecting switch for every operation. It is, however, difficult in terms of cost and practically impossible in terms of complication of an internal mechanism, a problem of arrangement space, etc. to provide a detecting switch for every operation. Therefore, a measure to allow all the operations to be controlled by the smallest number of detecting switches has been taken in the related photomagnetic recording/reproduction apparatus. Although there is a difference in accordance with the structure of the internal mechanism, all the operations can be generally controlled by three detecting switches.

That is, though not shown in FIGS. 4 to 7, there are provided an insertion position detecting switch SW1 for detecting the fact that the disk 1 has been inserted (that is, the disk 1 has been inserted to reach the position A shown in FIG. 5), a reproducing position detecting switch SW2 for detecting the fact that the movable holder 3 holding the disk 1 has reached the reproducing position (position shown in FIG. 6) of the disk 1, and a recording position detecting switch SW3 for detecting the fact that the magnetic head 5 has come into contact with the disk 1 in the reproducing position. Each of the detecting switches SW1 to SW3 is constituted by a limit switch.

The aforementioned various operations such as leading of the disk 1 into the movable holder 3, loading of the movable holder 3, positioning of the disk 1 and the photo pick-up 4 in the reproducing position by the loading, descending of the magnetic head 5, positioning of the descended magnetic head 5 and the disk 1 in the recording position, and positioning of the disk 1 and the photo pick-up 4 in the reproducing position by ascending the magnetic head which has been descended, are generally driven by one motor. Accordingly, configuration is made so that the series of operations interlock with one another mechanically. For this reason, the movable holder 3 holding the disk 1 moves delicately, for example, even in the case of a descending or ascending operation of the magnetic head 5.

As described above, each of the detecting switches SW1 to SW3 is constituted by a limit switch. The limit switch can perform accurate positional detection in one direction because the detection is made in a direction (open to close) in which a movable contact point comes into contact with a fixed contact point. There is, however, a problem that the limit switch can hardly perform accurate positional detection in the other direction because the detection is made in a direction (close to open) in which the movable contact point separates from the fixed contact point.

As described above, the reduction in number of detecting switches to the required smallest number, the mechanism configuration in various operations driven by one motor to interlock with one another, and the provision of the detecting switches each constituted by a limit switch make it possible difficult to perform positional detection accurately in one direction while make it difficult to perform positional detection accurately in the other direction. Hence, the following disadvantage occurs.

The disadvantage will be described below with reference to FIG. 8. FIG. 8 is a time chart showing the respective detecting switches SW1 to SW3 which are arranged rightward in a sequence of detection in the case where a disk I is loaded into the apparatus body 2. Each of the detecting switches SW1 to SW3 is arranged to make an operation of "open to close" when rightward force in FIG. 8 is applied to the switch. Further, the direction of rotation of the motor to move the disk 1 in a direction (rightward in FIG. 8) of insertion of the disk 1 into the apparatus body 2 is defined as a direction of reverse rotation (CCW) whereas the direction of rotation of the motor to move the disk 1 in a direction (leftward in FIG. 8) of ejection of the disk 1 from the apparatus body 2 is defined as a direction of forward rotation (CW).

That is, at the time of disk loading, the insertion position detecting switch SW1 changes from "H" to "L" when the disk 1 has reached the insertion position IN. The reproducing position detecting switch SW2 changes from "H" to "L" when the movable holder 3 holding the disk 1 has reached the reproducing position RP opposite to the photo pick-up 4. The recording position detecting switch SW3 changes from "H" to "L" when the magnetic head has been moved down to come into contact with the disk 1 in the reproducing position RP (that is, when the magnetic head 5 has reached the recording position RC). In this occasion, each of the detecting switches SW1 to SW3 makes a detecting operation of "open to close" as described above, so that accurate positional detection is performed.

That is, when the reproducing position detecting switch SW2 has detected the reproducing position RP the photo pick-up 4 is located accurately on the line L which passes through the center point O of the disk 1 as shown in FIG. 6. Similarly, when the recording position detecting switch SW3 has detected the recording position RC, the photo pick-up 4 and the magnetic head are also located accurately on the line L which passes through the center point O of the disk 1 as shown in FIG. 7.

On the other hand, when the disk 1 has been moved from the recording position RC to the reproducing position RP, that is, when the magnetic head 5 in contact with the disk 1 has ascended apart from the disk 1, the reproducing position detecting switch SW2 changes from "L" to "H" to detect the reproducing position RP. In this case, the reproducing position detecting switch SW2 makes a detecting operation of "close to open" as described above, so that accurate positional detection cannot be performed. Specifically, detection of the reproducing position RP is delayed by a slight time (Δt) as shown in FIG. 8. This means that the position of the movable holder 3 relative to the photo pick-up 4 is shifted delicately in accordance with the delay Δt of detection of the reproducing position RP because the detecting operation of the reproducing position detecting switch SW2 interlocks with the operations of mechanism portions inclusive of the operation of the movable holder 3. That is, as shown in FIG. 9, the line L passing through the center point O of the disk 1 held in the movable holder 3 is shifted to the ejection side by ΔP relative to the position of the photo pick-up 4.

For this reason, the chucking position of the disk 1 is displaced when a reproduction operation is started in this state. Hence, the disk 1 may be unable to rotate or the photo pick-up 4 may be unable to move in the scanning direction Y on the line L which passes through the center point O of the disk 1. Hence, there is a problem that clear reproduced sound cannot be obtained.

SUMMARY OF THE INVENTION

The present invention is achieved for solution of the aforementioned problem and an object thereof is to provide a photomagnetic recording/reproduction apparatus in which detection (especially, detection from a recording position RC to a reproducing position RP) of respective positions of a disk can be performed accurately without increase of the number of detecting switches and without complication of mechanism portions.

In order to achieve the above objects, according to the present invention, there is provided a photomagnetic recording/reproduction apparatus comprising:

a slot from which a photomagnetic disk is inserted in a first direction and ejected in a second direction;

a holder for accommodating the inserted photomagnetic disk therein;

a magnetic head for recording information onto the photomagnetic disk;

a optical pickup for reproducing information recorded in the photomagnetic disk;

a drive mechanism for moving the holder between an insertion position and a reproducing position and moving the magnetic head between an initial position thereof and a recording position, the insertion position at which the holder receives the inserted photomagnetic disk, the reproducing position at which the photomagnetic disk opposes to the optical pickup, and the recording position at which the magnetic head is brought into contact with the photomagnetic disk;

a first detector for detecting whether the photomagnetic disk is located at the reproducing position;

a second detector for detecting whether the magnetic head is located at the recording position; and a mechanism controller for controlling the drive mechanism such that the holder first moves in the second direction toward a stop position where is apart from the reproducing position in a predetermined distance and then moves in the first direction toward the reproducing position in a case where the second detector detects that the magnetic head is apart from the recording position.

Preferably, the stop position is located between the insertion position and the reproduction position. Accordingly, the photomagnetic disk is prevented from unexpectedly running out from the slot.

Preferably, the first and second detectors include a limit switch respectively. Here, the limit switch is pressed in the first direction.

According to the above configuration, even in the case where each of detector is constituted by a switch such as a limit switch permitting accurate positional detection only in one direction (the first direction), positional detection in the other direction from the recording position to the reproducing position can be performed accurately without increase of the number of detector and without complication of mechanism operating portions. Namely, configuration is made so that detection in the other direction (the second direction) is the same operation as that in one direction to thereby solve the problem of detection error which occurs in detection in the other direction.

BRIEF DESCRIPTION OF THE DRAWINGS

In the accompanying drawings:

FIG. 3 is a time chart for explaining a series of operations in the photomagnetic recording/reproduction apparatus in the case where a disk is loaded into the apparatus body and subjected to recording, reproduction, etc;

FIGS. 4A, 5A, 6A and 7A are schematic sectional views for explaining an operation of mechanism operating portion in the case where a disk is loaded into the apparatus body;

FIGS. 4B, 5B, 6B and 7B are schematic plan views for explaining an operation of mechanism operating portion in the case where a disk is loaded into the apparatus body;

DETAILED DESCRIPTION OF THE PREFERRED EMBODIMENTS

An embodiment of the present invention will be described below with reference to the drawings.

Figure 1:
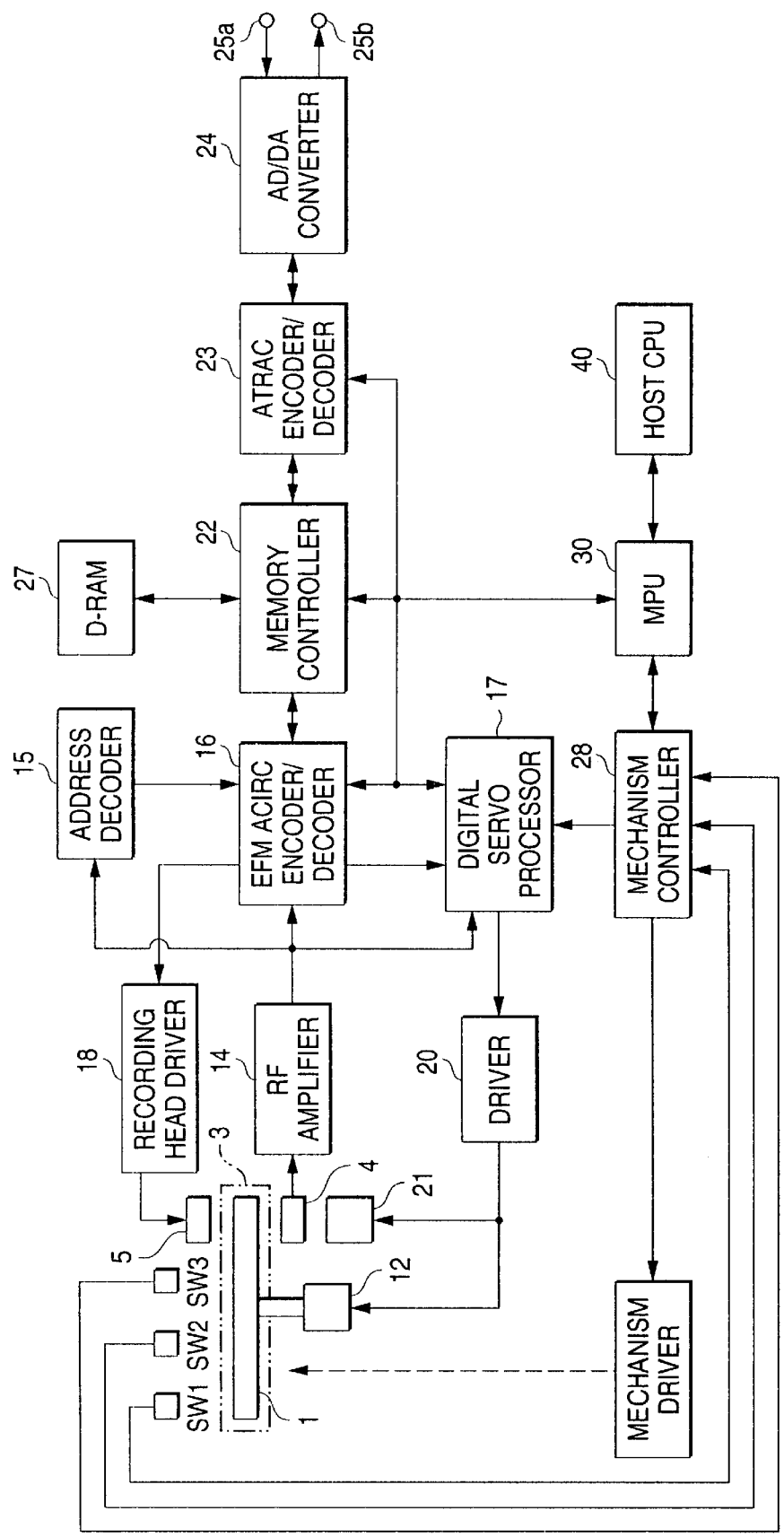
FIG. 1 is a block diagram showing the system configuration of an MD recorder which is a photomagnetic recording/reproduction apparatus according to one embodiment of the present invention.

FIG. 1 is a system configuration view of an MD recorder which is a photomagnetic recording/reproduction apparatus according to the present invention.

An output of a photo pick-up 4 for detecting information from a photomagnetic disk (hereinafter referred to as disk) driven to rotate by a spindle motor 12 is led to an address decoder 15, an EFM·ACIRC encoder/decoder 16 and a digital servo processor 17 through an RF amplifier 14. An output of the address decoder 15 is led to the EFM·ACIRC encoder/decoder 16. Further, an output of the EFM·ACIRC encoder/decoder 16 is led to a recording magnetic head 5 through an REC head driver 18. The EFM·ACIRC encoder/decoder 16 performs, for example, a process of sectioning a 16-bit signal into 8-bit parts and converting the 8-bit parts into 14-bit parts in accordance with an error correction method using EFM modulation or ACIRC.

The output of the EFM·ACIRC encoder/decoder 16 is also led to the digital servo processor 17. An output of the digital servo processor 17 is led to a spindle motor 12 and a thread motor 21 through a driver 20. The thread motor 21 is provided for moving the photo pick-up 4 and the magnetic head 5 as a whole in a radial direction (disk scanning direction Y) of the disk 1.

Further, the EFM·ACIRC encoder/decoder 16 is bidirectionally connected to a memory controller 22. The memory controller 22 is bidirectionally connected to an ATRAC encoder/decoder 23. The ATRAC encoder/decoder 23 is bidirectionally connected to an AD/DA converter 24 having an analog audio input terminal 25a and an analog audio output terminal 25b.

A memory (D-RAM) 27 as a data buffer for preventing sound from skipping due to vibration, or the like, is connected to the memory controller 22. The memory controller 22 performs, for example, a process of once storing the digital signal reproduced from the disk 1 in the D-RAM 27 and then taking the digital signal out from the D-RAM 27 to the ATRAC encoder/decoder 23 successively. Further, the ATRAC encoder/decoder 23 performs compression of data and expansion of compressed data in accordance with a high-efficient encoding process called ATRAC.

Each of the EFM·ACIRC encoder/decoder 16, the digital servo processor 17, the memory controller 22 and the ATRAC encoder/decoder 23 is bidirectionally connected to an MPU 30 which controls the operation of the apparatus as a whole. The MPU 30 is bidirectionally connected to a host CPU 40 which is a key controller. The MPU 30 receives various commands transmitted from the host CPU 40 and executes various processes in accordance with the received commands.

A mechanism controller 28 for controlling respective mechanism operating portions shown in FIGS. 4 to 7 is bidirectionally connected also to the MPU 30. Configuration is made so that respective detection signals, which are delivered from the insertion position detecting switch SW1 for detecting the fact that the disk 1 has been inserted (that is, the disk 1 has been inserted to reach the position A (IN) shown in FIG. 5), the reproducing position detecting switch SW2 for detecting the fact that the movable holder 3 holding the disk 1 has reached the reproducing position RP (position shown in FIG. 6) of the disk 1 and the recording position detecting switch SW3 for detecting the fact that the magnetic head 5 has come into contact with the disk 1 in the reproducing position RP, are led to the mechanism controller 28.

Figure 2:
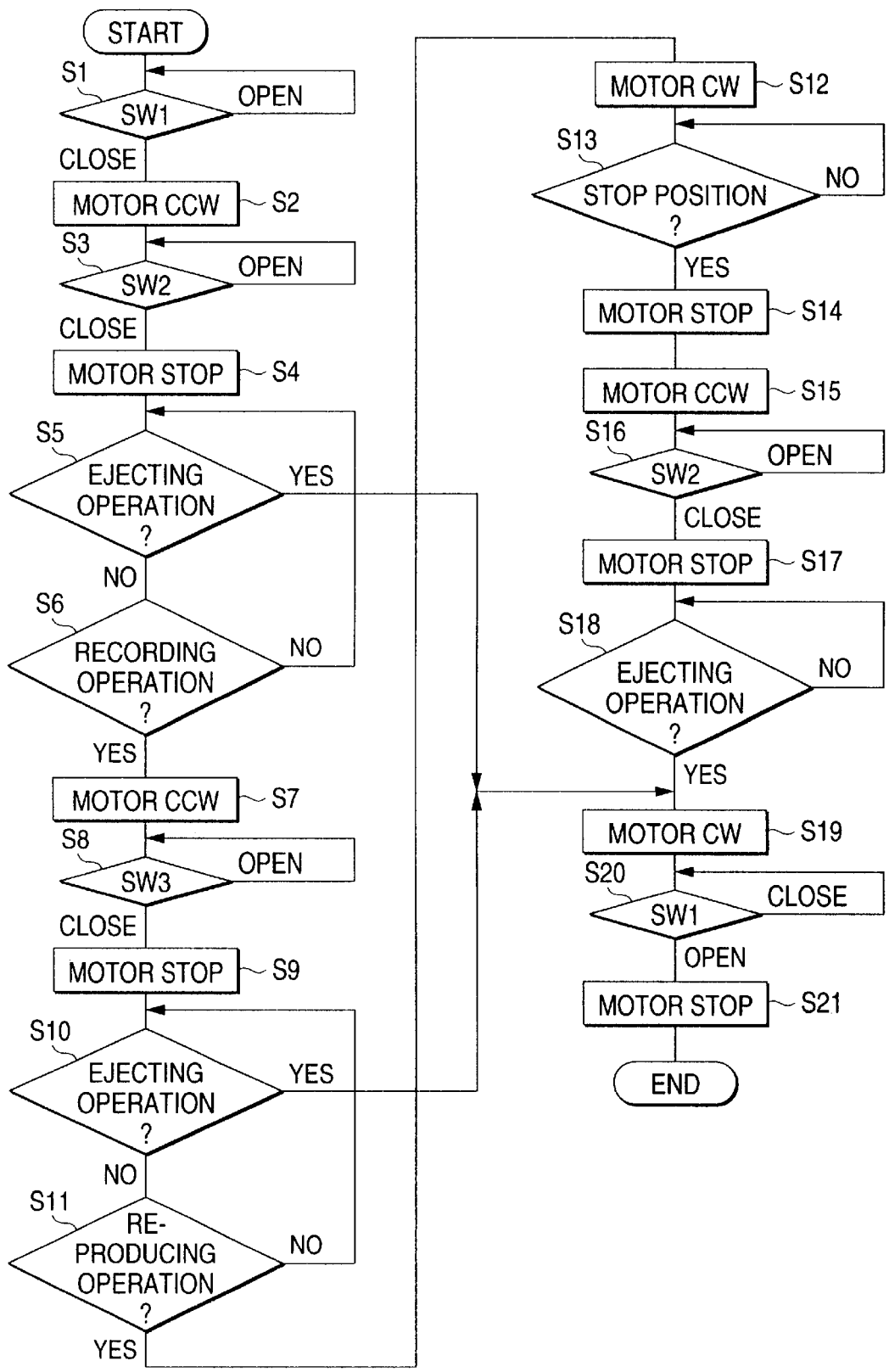
FIG. 2 is a flow chart for explaining a series of operations in the photomagnetic recording/reproduction apparatus in the case where a disk is loaded into an apparatus body and subjected to recording, reproduction, etc.
Figure 5A:
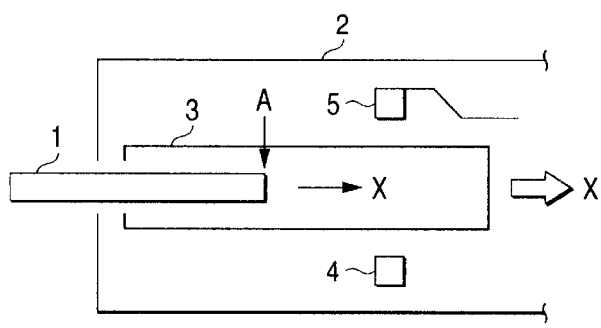
Figure 5B:
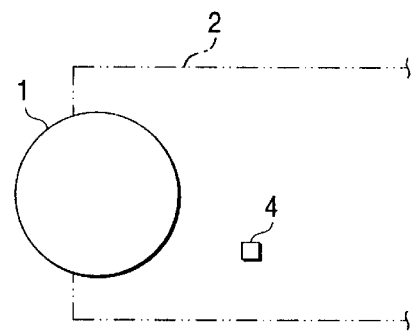
Figure 6A:
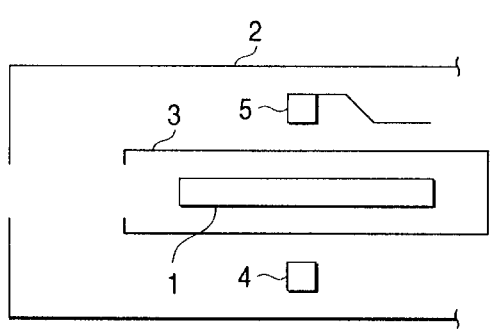
Figure 6B:
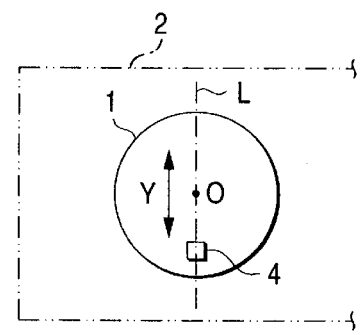
Figure 7A:
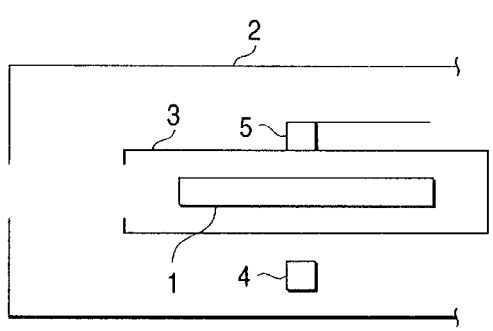
Figure 7B:
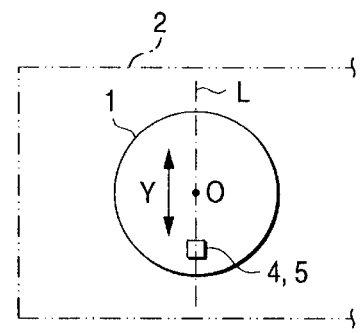

The series of operations in the MD recorder configured as described above in the case where the disk 1 is loaded into the apparatus body and subjected to recording, reproduction, etc. will be described below with reference to a flow chart shown in FIG. 2, a time chart shown in FIG. 3 and schematic views of the mechanism operating portion shown in FIGS. 4 to 7. Incidentally, the time chart of FIG. 3 is shown in the same condition as that in the time chart of the background art shown in FIG. 8.

That is, when a user inserts a disk 1, through the insertion hole 2a of the apparatus body 2, into the movable holder 3 provided in the inside of the apparatus body 2 (see FIG. 4), the insertion position detecting switch SW1 detects the insertion of the disk 1 and changes from "H" to "L" at a point of time when the disk 1 has been inserted to reach a certain position A (IN) (FIG. 5) in the movable holder 3. Upon reception of the "L" signal from the insertion position detecting switch SW1, the mechanism controller 28 rotates the spindle motor 12 reversely (steps S1 and S2) so that the disk 1 is led into the movable holder 3 automatically and, at the same time, the movable holder 3 is loaded in the X direction to reach the reproducing position RP (position shown in FIG. 6) opposite to the photo pick-up 4 disposed in the inside of the apparatus body 2.

When the disk 1 held in the movable holder 3 then reaches the reproducing position RP, the reproducing position detecting switch SW2 detects the disk's arrival at the reproducing position RP and changes from "H" to "L". Upon reception of the "L" signal from the reproducing position detecting switch SW2, the mechanism controller 28 stops the spindle motor 12 (steps S3 and S4). That is, this is a state in which reproduction is enabled to be started. In this state, the photo pick-up 4 is located on the line L which has the disk scanning direction Y and which passes through the center point O of the disk 1 (see FIG. 6).

If a recording button not shown is operated in this state ("Yes" is given in step S6 via step S5), the mechanism controller 28 rotates the spindle motor 12 reversely (step S7) and moves down the magnetic head 5. When the magnetic head 5 comes into contact with the disk 1, the recording position detecting switch SW3 detects the fact that the disk has reached the recording position RC and changes from "H" to "L". Upon reception of the "L" signal from the recording position detecting switch SW3, the mechanism controller 28 stops the spindle motor 12 (steps S8 and S9). That is, this state is a state in which recording is enabled to be started. In this state, the photo pick-up 4 and the magnetic head 5 vertically opposite to each other are located on the line L which has the disk scanning direction Y and which passes through the center point O of the disk 1 (see FIG. 7). When the disk 1 in this state is rotated and the photo pick-up 4 and the magnetic head 5 are integrally moved on the line L in the disk scanning direction Y an audio signal is recorded on the disk 1.

Figure 8:
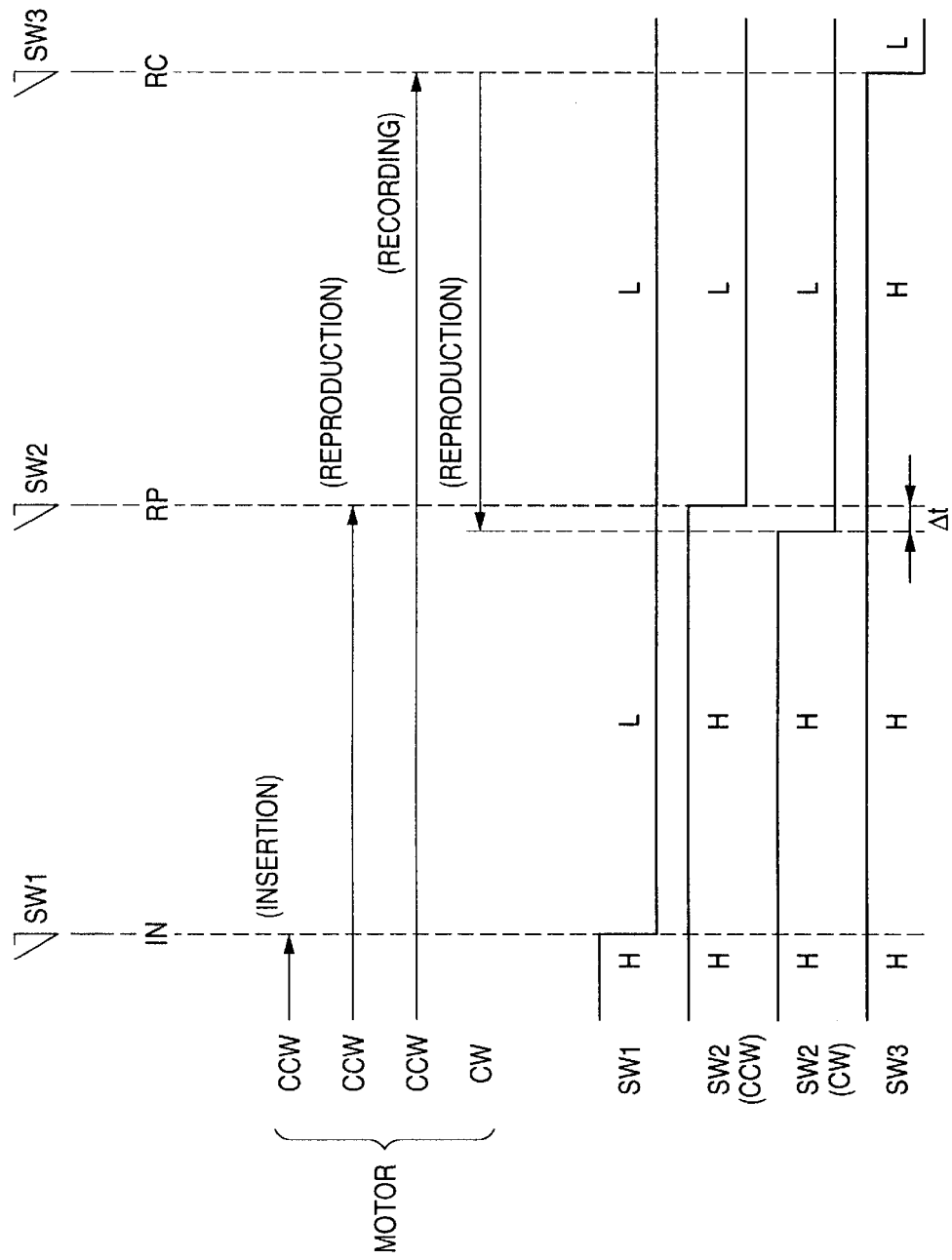
FIG. 8 is a time chart for explaining a series of operations in a related photomagnetic recording/reproduction apparatus in the case where a disk is loaded into an apparatus body and subjected to recording, reproduction, etc.
Figure 9:
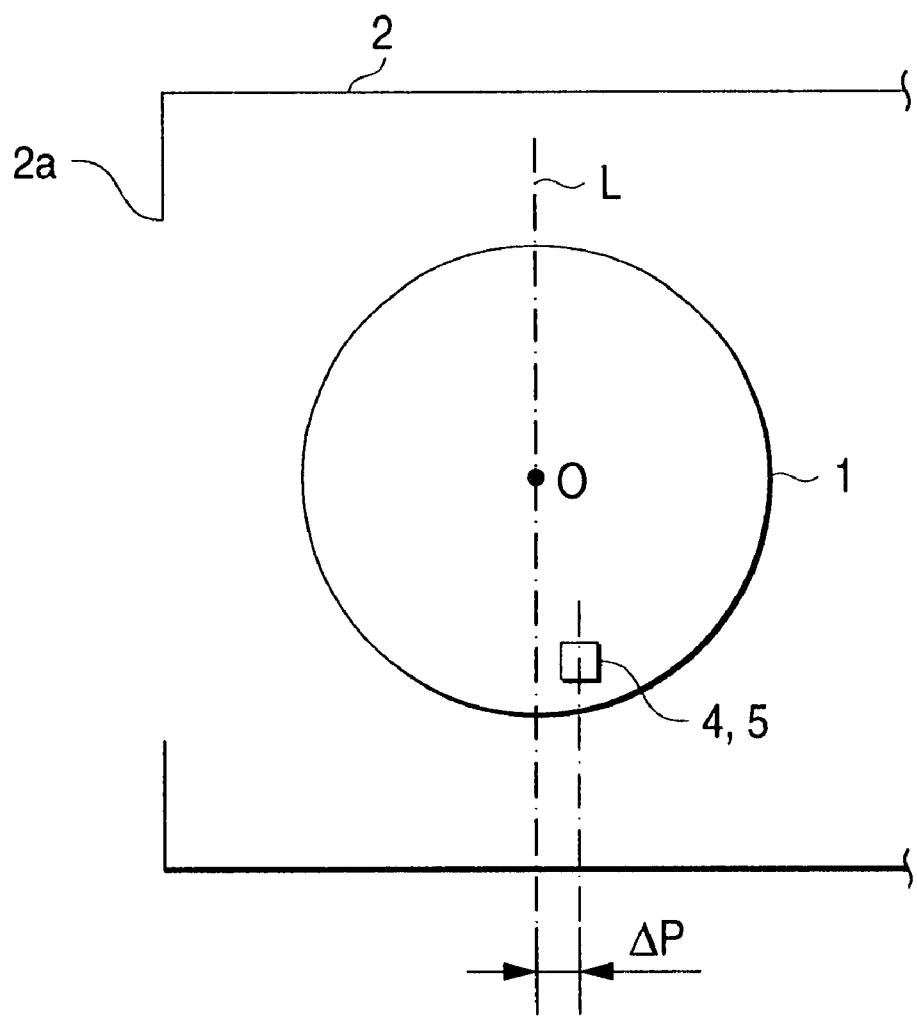
FIG. 9 is a view for explaining a disadvantage of the related photomagnetic recording/reproduction apparatus at the time of detection of disk movement from a recording position RC to a reproducing position RP.

If a reproduction button not shown is operated in this state ("Yes" is given in step S11 via step S10), the mechanism controller 28 rotates the spindle motor 12 forward (step S12) and moves up the magnetic head 5 from the disk 1. When the magnetic head 5 is restored to the original position, the reproducing position detecting switch SW2 changes from "L" to "H" to detect the reproducing position RP. In this occasion, the reproducing position detecting switch SW2 makes a detecting operation of "close to open", so that the detection of the reproducing position RP is delayed by a slight time (Δt) as shown in FIG. 8.

Therefore, in this embodiment of the present invention the detection from the recording position RC to the reproducing position RP is performed as follows.

That is, when the magnetic head 5 is moved from the recording position RC to the reproducing position RP, the movable holder 3, which operates slightly interlocking with the magnetic head 5, is further moved by a predetermined distance P2 (see FIG. 3) in a direction of ejection (unloading direction −X) beyond the reproducing position RP without stopping thereat. That is, after the mechanism controller 28 moves the movable holder 3 to a predetermined stop position (that is, if "Yes" is given in step S13), the mechanism controller 28 stops the normal rotation of the spindle motor 12 (step 14) and then immediately starts the reverse rotation of the spindle motor 12 (step S15) to move the movable holder 3 to the reproducing position RP in the loading direction X.

When the disk 1 held in the movable holder 3 then reaches the reproducing position RP, the reproducing position detecting switch SW2 detects the disk's arrival at the reproducing position RP and changes from "H" to "L" (step S16). The detection by the reproducing position detecting switch SW2 in this occasion is detection of "open to close", so that the reproducing position RP of the disk 1 is detected accurately. Upon reception of the "L" signal from the reproducing position detecting switch SW2, the mechanism controller 28 stops the spindle motor 12 (step S17). In this manner, the photo pick-up 4 is located on the line L which passes through the center point O of the disk 1 (see FIG. 6). Hence, from this state, the disk 1 can be shifted into a good reproducing operation.

In this occasion, the stop position, that is, the predetermined distance P2 from the reproducing position RP is determined on the basis of the following condition. That is, predetermined distances P2 and P1 are determined to satisfy the relations P1>ΔpO and P2>ΔpO in which P1 is the distance to the disk stop position from the disk insertion position IN detected by the insertion position detecting switch SW1 changing from "H" to "L" (that is, the distance from the insertion position IN to the reproducing position RP is equal to P1+P2), and ΔpO is the distance by which each mechanism operating portion is moved until the mechanism operating portion stops actually after a stop signal is delivered from the mechanism controller 28 to the mechanism operating portion. By the determination of the predetermined distances P2 and P1, the disk 1 can be prevented from making an operation of instantaneously projecting out of the insertion hole 2a of the apparatus body 2 and then being pulled into the insertion hole 2a again even in the case where the movable holder 3 (disk 1) is moved by the predetermined distance P2 in the direction of ejection beyond the reproducing position RP. That is, a misleading operation giving the user the impression of a wrong operation can be prevented.

If an ejection button not shown is then operated ("Yes" is given in step S18), the mechanism controller 28 releases chucking of the disk 1 and then rotates the spindle motor 12 forward (step S19) to eject the disk 1. Then, at a point of time when the ejected disk 1 has reached a certain position A (IN) (shown in FIG. 5), the insertion position detecting switch SW1 detects the disk's arrival at the position A and changes from "L" to "H". Upon reception of the "H" signal from the insertion position detecting switch SW1, the mechanism controller 28 stops the spindle motor 12 (steps S20 and S21). Then, the disk 1 (disk casing) projecting out of the insertion hole 2a of the apparatus body 2 can be pulled out by the user so that the disk 1 can be entirely ejected from the apparatus body 2.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A photomagnetic recording/reproduction apparatus comprising:
   a slot from which a photomagnetic disk is inserted in a first direction and ejected in a second direction;
   a holder for accommodating the inserted photomagnetic disk therein;
   a magnetic head for recording information onto the photomagnetic disk;
   a optical pickup for reproducing information recorded in the photomagnetic disk;
   a drive mechanism for moving the holder between an insertion position and a reproducing position and moving the magnetic head between an initial position thereof and a recording position, the insertion position at which the holder receives the inserted photomagnetic disk, the reproducing position at which the photomagnetic disk opposes to the optical pickup, and the recording position at which the magnetic head is brought into contact with the photomagnetic disk;
   a first detector for detecting whether the photomagnetic disk is located at the reproducing position;
   a second detector for detecting whether the magnetic head is located at the recording position; and
   a mechanism controller for controlling the drive mechanism such that the holder first moves in the second direction toward a stop position where is apart from the reproducing position in a predetermined distance and then moves in the first direction toward the reproducing position in a case where the second detector detects that the magnetic head is apart from the recording position.

2. The photomagnetic recording/reproduction apparatus as set forth in claim 1, wherein the stop position is located between the insertion position and the reproduction position.

3. The photomagnetic recording/reproduction apparatus as set forth in claim 1, wherein the first and second detectors include a limit switch respectively.

4. The photomagnetic recording/reproduction apparatus as set forth in claim 3, wherein the limit switch is pressed in the first direction.

5. The photomagnetic recording/reproduction apparatus as set forth in claim 2, wherein the predetermined distance is determined so as to be longer than a moving length of the holder while a period until the drive mechanism actually stops since the mechanism controller issues a stop instruction to the drive mechanism.

* * * * *